April 7, 1970   J. K. McCLEARY   3,504,814
PLURAL-UNIT CARGO CARRIER
Filed Feb. 5, 1968   2 Sheets-Sheet 1
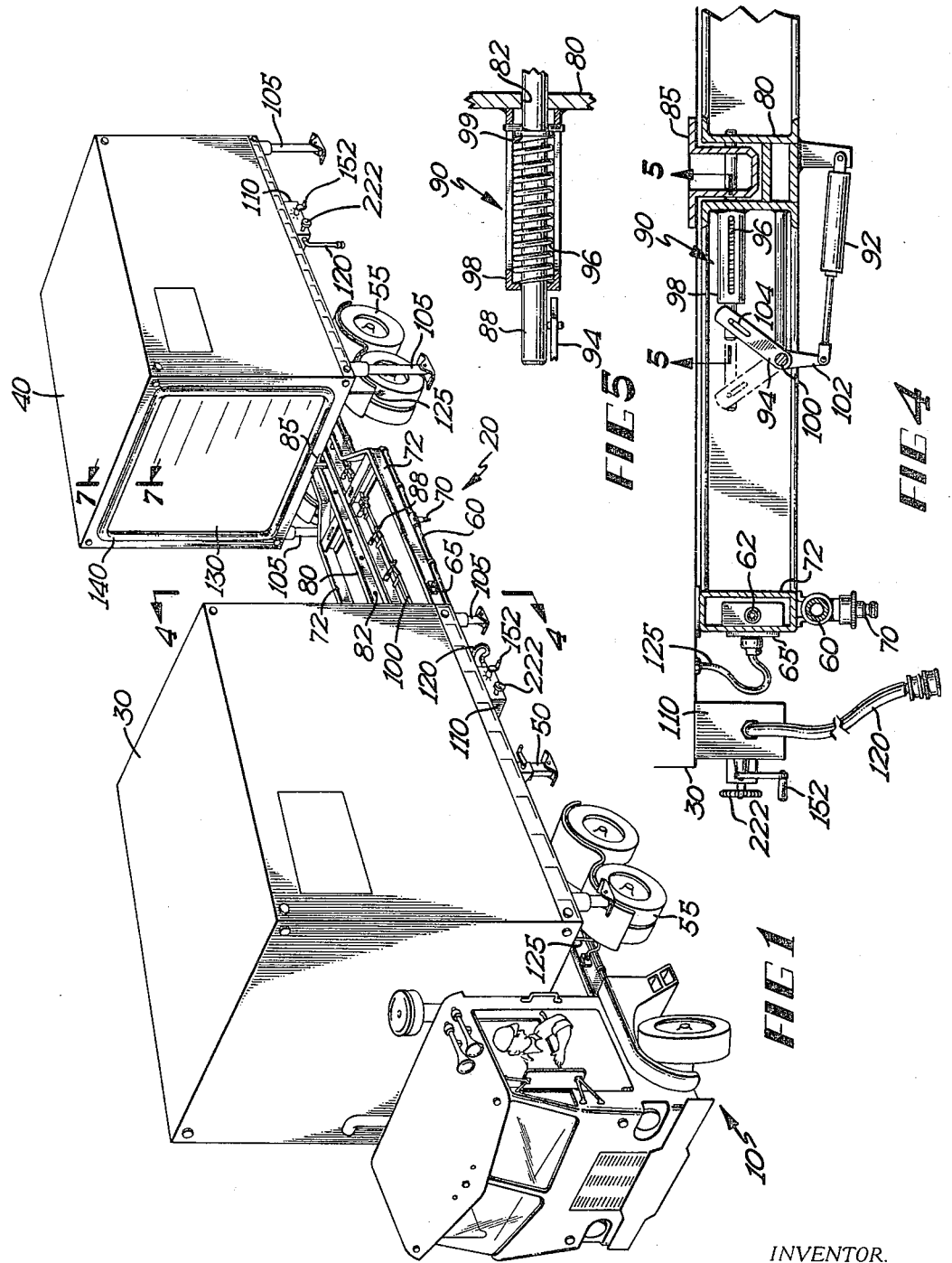
INVENTOR.
JAMES K. McCLEARY
BY
Schroeder, Siegfried
& Ryan
ATTORNEYS April 7, 1970        J. K. McCLEARY        3,504,814
PLURAL-UNIT CARGO CARRIER
Filed Feb. 5, 1968        2 Sheets-Sheet 2
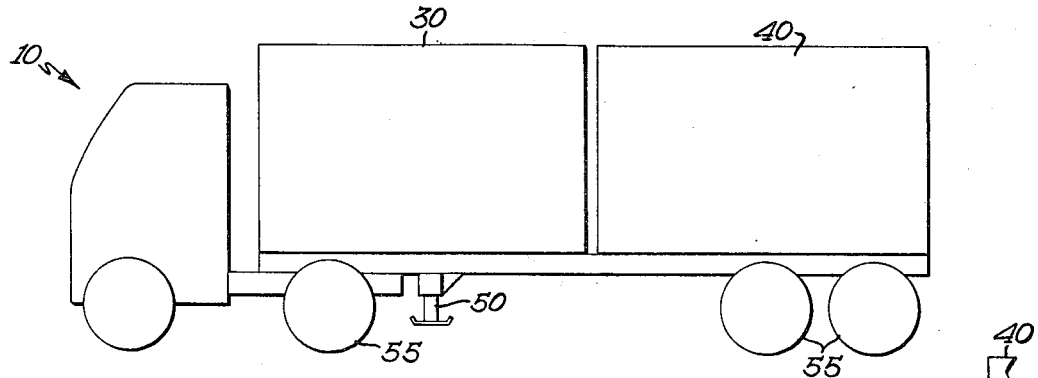
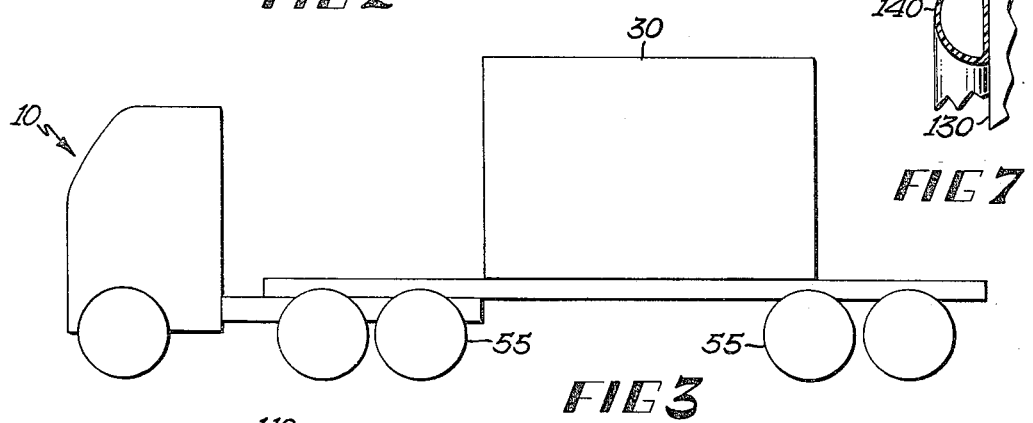
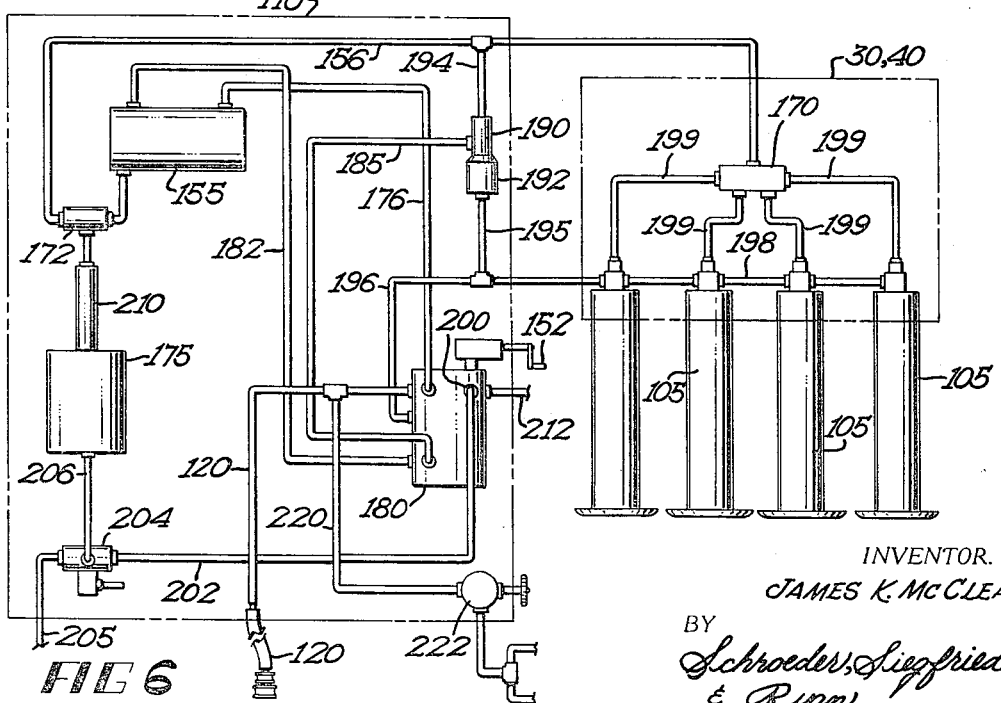
INVENTOR.
JAMES K. McCLEARY
BY
Schroeder, Siegfried
& Ryan
ATTORNEYS

United States Patent Office 3,504,814
Patented Apr. 7, 1970

3,504,814
PLURAL-UNIT CARGO CARRIER
James K. McCleary, Minneapolis, Minn., assignor of forty percent to Gerald A. Bensfield, Minneapolis, Minn.
Filed Feb. 5, 1968, Ser. No. 703,092
Int. Cl. B60p 1/64
U.S. Cl. 214—515                                    8 Claims

ABSTRACT OF THE DISCLOSURE

A plural-unit cargo carrier in which a tractor-trailer or straight-body truck will carry a plurality of cargo-carrying bodies designed to hold less than carload lots for distribution at varying points to be unloaded without requiring that the motive source and driver remain during such unloading operation. The individual bodies include a self-contained power source operated from the pneumatic supply of such a tractor or truck with provisions for securing the cargo-carrying body in any one of a number of positions on the chassis member for stability purposes or for maximum loading and with provisions for sealing adjacent units to prevent the entrance of dirt and moisture between the same at the access openings therein.

---

This invention relates to plural-unit cargo carriers and more particularly to a plural-unit cargo carrier in which the individual units are detachable from the body of the carrier.

Trucks and trailers used in the carrying of cargo have previously employed a plurality of units in a tandem-mounted relationship such that the individual units may be detached therefrom and loaded and unloaded without idling the truck or trailer for this purpose. Such a construction facilitates the usage of less than complete load operation for the truck or trailer permitting a plurality of such loads to be carried and distributed at various points without idling the trucks or drivers during the loading and unloading. The economy of using a plurality of such units on a single truck or carrier has been well recognized, but the particular structure employed in detaching and attaching the individual cargo-carrying units from the truck or trailer body are complex and do not permit ease and safety in detaching or attaching such bodies with the truck or trailer. More importantly where operation of the truck or trailer is required with less than a complete load thereon, the positioning of the cargo-carrying bodies are normally fixed in location such as to unbalance the truck or trailer and introduce a factor of instability in the operation of the supporting vehicle.

The present invention is directed to an improved plural-unit cargo carrier in which the individual cargo-carrying bodies are readily attachable and detachable from the truck or trailer chassis, are rigidly attached thereto during transportation and may be adjustably positioned at varying points along the chassis where less than a complete load is being transported for stability of the vehicle. Further, the improved cargo carrier utilizes individual cargo-carrying bodies with their own elevating means to allow them to be elevated clear of the chassis for removal therefrom and with such elevating means being actuated from the fluid-power supply on the tractor or truck engine. In addition, the plural-unit cargo carrier maintains provision for positioning the individual cargo-carrying bodies in a tandem and abutting relationship with a seal therebetween and with access openings at either end to facilitate removal of cargo from within the individual bodies and to seal the bodies on the chassis member to eliminate the problems of dirt and the elements of entering the interior of the individual cargo-carrying bodies.

Therefore, it is the principal object of this invention to provide an improved plural-unit cargo carrier particularly adaptable for use in less than carload lot transportation and distribution at different areas.

Another object of this invention is to provide in an improved plural-unit cargo carrier a simplified means for attaching and detaching the individual cargo-carrying bodies thereon.

A further object of this invention is to provide in a plural-unit cargo carrier provision for supplying power to the motive means of the retractable supports on the individual bodies and controlling its operation for extension of the same to remove the bodies for varying positions on the chassis member of the carrier.

Another object of this invention is to provide an improved plural-unit cargo carrier in which the individual cargo-carrying bodies are securely locked thereon and may be readily positioned in varying positions on the chassis of the cargo carrier for stability purposes.

Still another object of this invention is to provide an improved seal between individual cargo bodies in a plural-unit cargo carrier.

These and other objects of this invention will become apparent from a reading of the attached description together with the drawings wherein:

FIGURE 1 is a perspective view of the improved plural-unit cargo carrier showing one cargo-carrying body being discharged, FIGURE 2 is a schematic view of the plural-unit cargo carrier showing a plurality of units thereon, FIGURE 3 is a schematic view of the plural-unit cargo carrier with a single cargo-carrying body thereon, FIGURE 4 is a sectional view of a portion of the plural-unit cargo carrier of FIGURE 1 taken along the lines 4—4 therein, FIGURE 5 is a sectional view of a portion of the plural-unit cargo carrier taken along the lines 5—5 in FIGURE 4, FIGURE 6 is a schematic view of the pneumatic-hydraulic drive system for the supporting members on the cargo bodies of the plural-unit cargo carrier, and FIGURE 7 is a sectional view of a portion of a cargo body taken along the lines 7—7 in FIGURE 1.

My plural-unit cargo carrier is shown in FIGURE 1 in connection with a tractor-trailer unit, the tractor being indicated generally at 10 and the trailer generally at 20. For purposes of the present disclosure, the tractor-trailer unit is shown mounting a pair of cargo-carrying bodies, indicated generally at 30 and 40 respectively, such units being designed for the carrying of less than carload lots to be distributed at varying destinations by dropping a cargo-carrying body and permitting the tractor-trailer unit to move on to a second destination without the delay introduced by unloading time. It will be understood that the plural-unit cargo carrier may be applied to a straight body type truck and the number of cargo-carrying bodies may vary depending upon the physical size of the same and the overall length of the transporting vehicle. In the present disclosure, the trailer portion of the tractor-trailer unit is defined as the chassis member which supports the plural bodies 30 and 40. The latter would incorporate a normal supporting member 50 which would be manually operated or dropped whenever it was desired to detach the trailer therefrom apart from the bodies. Similarly, the trailer may have any number of supporting wheels, such as is indicated by the wheels 55, and would incorporate normal pneumatic lines or hydraulic lines from a motive source on the tractor 10 for operation of the brakes of the trailer unit at the rear wheels 55 thereof. Such pneumatic lines shown herein as pneumatic are indicated schematically at 60 together with suitable electrical conductors 62 which would electrify the trailer for proper signaling from the electrical system of the cab, such as taillights, brake lights and turn signals together with appropriate lighting on the respective bodies for night travel. The pneumatic line, in addition to operating the brake system of the rear wheels of the trailer will incorporate a connection to the respective bodies, as will be hereinafter noted. Suitable plug-in connectors, such as is indicated at 65 in the electrical conductors and 70 in the pneumatic line, permit the coupling of the flexible electrical conductors and flexible pneumatic tubing to the respective cargo-carrying bodies 30 and 40. The chassis or trailer construction incorporates the conventional frame 72 which would mount the fifth wheel (not shown) for the trailer together with supporting members 50 thereof and rear wheel 55 for the same. In addition, it will incorporate the centrally located channel member 80 suitably supported by cross bracing 82 on the frame which will aid in the mounting of the cargo-carrying bodies thereon. The U-shaped frame section 80 is shown in detail in FIGURE 4 and an appropriate locking mechanism, to be later defined, is incorporated therewith to secure the cargo-carrying bodies thereon. The rear end of the U-shaped channel member at the rear of the trailer chassis is flared or open (not shown) to facilitate mounting of the cargo bodies thereon. The channel member 80 extends the length of the chassis member and has a plurality of uniformly spaced apertures 82 spaced along the extent of the same.

Positioned on the bottom of each of the cargo-carrying bodies is a generally T-shaped flange member 85 with similar apertures therein adapted to align with the apertures 82 in the U-shaped channel member for the purpose of securing the bodies on the chassis member for transportation purposes. A locking assembly comprised of a plurality of pins 88 mounted in a spring-bias assembly 90 (best seen in FIGURE 5) and actuated by an actuator 92 each operating through bell-type linkages 94 will pivot the pins to a position such as is shown in phantom in FIGURE 4 to permit separation of the body members from the channel member of the chasis. Each of the pins are spring-biased by means of the coil spring 96 which encircles the pin 88 and is mounted in a cylindrical retaining flange 98 with the springs bearing against the flange in one extremity and the collar 99 on the respective pins at the other to bias the same toward a position in which the pins project through the apertures 82 in a channel member 80. The pins 88 associated with each of the respective apertures are operatively connected to bell cranks 94 mounted on a common shaft 100 and rotated through operation of the linkage 102 coupling the shaft end of the actuator 92 thereto. The actuator causes rotation of the shaft to simultaneously operate all of the bell cranks. Each of the pins are connected through the lost motion type connection, indicated at 104, to the bell cranks to permit the longitudinal or sliding movement of the pins within their respective spring housings 90 and the apertures 82 and corresponding apertures in the T-shaped flange members 85 on the bottom of each of the cargo-carrying bodies.

As will be later noted, whenever it is desired to disconnect a body from the trailer chassis, the actuator 92 is actuated to release respective pins and, as will be hereinafter noted, the bodies will be moved by actuation of support members 105 to clear the chassis member.

Each of the bodies has the depending support members 105 at the corners or edges of the same which support members are operable to telescopically move vertically between a ground engaging position, wherein the body will be lifted clear of the chassis and supported in such a position, to a retracted position in which the body will be allowed to rest on the chassis member and be secured thereto with the depending supporting members 105 moved clear of the ground. Each of these support members 105 are operated simultaneously from a single control panel or mechanism, indicated generally at 110, and powered through a flexible coupling 120 from the uncontrolled air pressure line 60 coupled to the air source of the tractor. Although not shown, it will be understood that the brake system of the trailer unit will be coupled to that of the tractor through a separate air line which will be controlled by brake pedals in a conventional manner. The pressure line 60 has a plurality of couplings 70 along the extent of the same which couplings permit positioning of the bodies at varying positions along the extent of the trailer member and which, when coupled to the flexible hose, will open to permit air pressure in the air supply lines to be directed through the control member and into the respective actuators in a manner to be later defined. The respective bodies include flexible electrical conductors 125 which plug into the electrical conduit 62 at the various receptacles 65 positioned along the extent of the chassis member so that the respective bodies may have controlled lighting thereon either for general indication or lighting as well as turn signal and brake lighting. Since these details form no part of the present invention, they are omitted for simplicity.

With the various coupling locations along the extent of the chassis member for the pneumatic air source and the electrical connections, there is provided a plurality of choices of connection such that a number of cargo-carrying bodies may be carried on a trailer in varying locations thereon. For simplicity, we have shown two such cargo-carrying bodies 30 and 40 schematically in FIGURE 2 in a normal distribution which would cover the extent of the trailer chassis. Thus, a tractor-trailer unit may be moved between distinations with less than truckload lots in each of the respective cargo-carrying bodies and with varying distinations for such cargo-carrying bodies. As each respective destination is reached for the less than truckload lot, the respective cargo-carrying body holding the same may be detached from the trailer chassis and left there to be unloaded. For this purpose, the individual cargo bodies will have doors, such as is indicated at 130, at one extremity of the same. If desired, doors may be located at both extremities of the body and such doors may take varying forms, such as a roll-up or slidable type. Surrounding the doors are inflatable rubber tubes 140 which are connected internally through the control panel or mechanism 110 and a valve 142 thereon to be inflated from the pneumatic source 60. These tubes, surrounding doors when the cargo bodies are in abutting relationship serve as a seal between units to prevent entrance of the elements to the doors and seepage into the respective bodies for the purpose of keeping the cargo therein clean and dry.

Whenever a single unit or less than a complete number or capacity for a trailer is left on the trailer to be hauled to the next destination, it is desirable that the body be repositioned to the best position of stability for safe and economical handling of the trailer-tractor unit or the straight-body truck, as the case may be. Thus, as will be shown in FIGURE 3, when one such unit is dropped at a destination, the remaining unit may be repositioned on the chassis member to a position intermediate the wheels thereof for best weight distribution on the trailer unit and recoupled thereto to be locked thereon by the respective pins 88 extending through the channel member 80 and the flange member 85 for the associated body. The plurality of positions or couplings 70 in the pneumatic line and the electrical connections 65 in the electrical line permit positioning of the body at varying positions along the chassis member for stability purposes.

The individual systems for operating the respective support members 105, that is moving them from an elevated position to an extended position wherein they will lift the cargo-carrying body off of the chassis member, may take varying forms and for disclosure purposes, the pneumatic-hydraulic circuit shown in FIGURE 6 discloses broadly a system which is claimed and described in the patent to R. L. Konkle No. 3,177,664, dated Apr.

13, 1965, and entitled Hydro-Pneumatic System. In this type of system, air from the pneumatic lines of a truck are used with a closed hydraulic system to actuate the support members 105 between retracted and extended position with provisions for boosting the pneumatic pressure hydraulically to increase the lifting force and with suitable valving for locking the same in an extended position whenever the air line is disconnected from the chassis of the tractor or trailer unit. Thus, in the schematic circuit of FIGURE 6, the supporting members 105 include built-in actuators which are actuated in one direction from an enclosed hydraulic circuit and in the opposite direction from the pneumatic source. The pneumatic source line is shown at 120 which represents the flexible pneumatic coupling or hose which would be attached to any of the coupling members 70 on the pneumatic source line 60 and extend into the control panel or mechanism 110 having a valve handle 152 extending therefrom to operate a cylindrical hydraulic valve member. The control mechanism would include a hydraulic tank supply 155 connected by pipes 156 to a divider valve 170 leading to the branch lines for each of the actuators within the members 105. A suitable check valve 172 is included in this circuit, the check valve being connected to hydraulic boost cylinder 175, one portion of which is exposed to the pneumatic air supply and the other to the self-contained hydraulic valve supply. The tank 155 has a hydraulic supply pipe 182 leading thereto from a rotary valve 180 which couples through the rotary valve to a pipe 185 and a valve section 190 of a hydraulic release valve 192. The release valve 192 as will be later noted, is controllably energized by the air supply through a conduit 195. A hydraulic return conduit 194 connects to the conduit 156 of the hydraulic supply to permit flow of the hydraulic fluid from the actuators through the conduit 194 and the upper side of the control valve 190 to pipe 185 and the porting within the main control valve 180 back to tank 155 through pipe 182. The internal details of valve 180 are omitted for simplicity. In one position of the control lever 152, this passage will be open allowing the return of fluid through a conduit 182 to the hydraulic supply sump. The air supply, as represented by the pipe 120 entering the control mechanism 110, extends to the main flow valve 180 and through a passage therein to a conduit 196 extending to and in common with the conduit 195 on the hydraulic release valve to apply pressure to the same and to conduits 198 common to all of the actuators of the supporting members 105. The diverting valve 170 supplies hydraulic fluid to each of the actuators in a similar manner through conduits 199 in parallel for purpose of actuating the supporting members in a raising direction. The air supply is also directed through a port in the upper side of the main control valve 180, through a conduit 176 to the hydraulic tank 155. Another port on the air side of the control valve 180 is connected to a conduit 202 and an exhaust valve 204 which has an exhaust pipe 205 extending therefrom. A secondary conduit 206 leading from the exhaust valve extends to the boost cylinder for the purpose of supplying air pressure to one side of the same. A smaller diameter ram piston, indicated by the section 210, in the boost cylinder increases the pressure of the hydraulic fluid over the air pressure applied to the boost cylinder and the hydraulic fluid is directed through the check valve 172 and into the actuators through the conduits 156 and 199. A similar exhaust passage, as evidenced by the conduit 212, extends from the upper part of the main control valve to allow evacuation of air from the actuators within the supporting members 105 in one control position as the actuators are operated through a raised position. In the above-identified patent, a hydro-pneumatic control system of this type is controlled in such a manner and through passages in the control valve 180 with varying position of the control handle 152 such that the hydraulic fluid may be significantly increased in pressure above the maximum pressure of the pneumatic source to provide a proper lifting force at the actuators of the supporting members 105 to lift a loaded cargo-carrying body from the chassis of the trailer. Prior to such an operation, however, the actuator 92 would be energized from the pneumatic source of the tractor unit and through a suitable control in the tractor cab (not shown) to overcome the pressure of the respective springs on the locking pins 80 in the channel member 82 and move the same from the locked position such that the cargo-carrying bodies may be removed from the chassis member. As the handle is actuated to increase the pressure and allow hydraulic fluid to flow into the actuators in a lifting direction for the supporting members, it would elevate the cargo-carrying bodies off of the chassis member or above the same such that the chassis may be removed by driving the tractor forward away from the same. Before such movement of the trailer unit takes place, the electrical connection and the pneumatic connection would be disconnected. Check valve 172 prevents reverse flow of the fluid into the tank or sump 155 and the actuator handle 152 is positioned to prevent the flow of hydraulic fluid through the passages 185 and 182 to the sump. Thus, the hydraulic fluid is trapped in the actuators and in the lines to maintain the members in a depressed elongated position elevating the cargo carrier above the chassis of the trailer. With disconnection of the bodies from the chassis member, the cargo-carrying body may be left to be unloaded. Also, included in the hydraulic-pneumatic diagram of FIGURE 6 is a control branch line 220 leading to a control valve 222 shown on the control panel but not included in the disclosure of the Konkle patent. This would control a pneumatic line from the control panel or mechanism 110 and through a conduit within the interior of the cargo-carrying body to the seal tubes 140 positioned around the doors or door of the cargo-carrying body. This valve will be manually operated to inflate the same during transportation.

Whenever a single unit is removed and left at a perdetermined destination for unloading purposes, it may be desirable for the truck operator to relocate the remaining cargo-carrying bodies on the chassis member for stability purposes. This can be done at the same time by operating the respective control valves or handles 152 on the respective cargo-carrying bodies to elevate the cargo-carrying bodies above the chassis member so that the chassis may be moved to reposition the same. The electrical and hose couplings would be disconnected and relocated in a new position and the members 105 or their actuators operated in opposite direction through the pneumatic power supply to allow the cargo-carrying bodies to be relocated on the chassis member. Similarly, whenever a body is to be picked up and returned to a destination for loading or additional use, the reverse of the procedure is provided with the chassis being driven under the respective cargo-carrying body to be added to the trailer unit and located in such a position that the apertures in the T-shaped flange member 85 align with the apertures 82 in the centrally located channel member 80 in the chassis. In this position the pins may be directed through such apertures whenever the cargo-carrying body is allowed to drop down onto the chassis member by reversing the actuation of the hydro-pneumatic system. This is accomplished by moving the control valve handle 152 of the main control valve to a new position in which the hydraulic fluid in the actuators of the support members will flow in a reverse direction through the conduits 199, valve 170, conduits 194 and 185, the control valve 180 and back to the hydraulic sump. In this position, the pneumatic air supply will be directed through the conduits 196 and 198 to the respective actuators to raise the supporting members to a retracted position for transportation purposes. In each instance, before operation of the control valve 180 to become effective, the flexible tubing 120 must be connected to the coupling member 70 and with such coupling, the air supply in the passage or conduit 60 on the chassis member will communicate with the control mechanism 110 and its components, some of which may be located within the frame of the cargo-carrying body, if desired. Although the details of this hydro-pneumatic system form no part of the present invention, it is shown here for explanation purposes as one type of hydro-pneumatic system which may be used to elevate or depress the supporting members for the cargo-carrying body for unloading or reloading of the same. During transportation, the tubular seals around the doors will be inflated to seal the intermediate doors or adjacent doors on the several cargo-carrying bodies on the chassis member to prevent the entrance of dirt and moisture therethrough.

In considering this invention, it should be remembered that the present disclosure is intended to be illustrative only and the scope of the invention should be determined by the appended claims.

What is claimed is:

1. A plural-unit cargo carrier comprising, a longitudinally extended chassis member, said chassis member including wheel supports for moving the same, a plurality of independent enclosed cargo-carrying bodies adapted to be supported on the chassis member for transportation thereby, each of said cargo-carrying bodies comprising a plurality of extensible support means positioned at the corners of the same and depending downwardly therefrom, motive means for said extensible support means to actuate said extensible support means, common conduit means positioned on the chassis member and extending along the extent of the same, means included on each of the cargo-carrying bodies adapted to selectively connect each of said motive means of said support means on each of the cargo-carrying bodies to the common conduit means for supplying fluid power to the motive means at varying positions along the extent of the chassis member, said motive means being operable to extend said extensible support means such as to elevate simultaneously from the corners the cargo-carrying body a predetermined distance above the chassis member, a single downwardly depending flange member located centrally on the undersurface of each of said cargo carrying bodies and having locking apertures therein, a single channel means included in the chassis member and extending centrally along the extent of the same and intermediate the edges of the same adapted to receive and enclose the flange means of said cargo-carrying bodies to position the cargo-carrying bodies on the chassis member and support with the edges of the chassis member the cargo-carrying bodies thereon, and cooperative pin means associated with members of said channel means and adapted to be moved into the locking apertures in the flange member to secure the cargo-carrying bodies on the chassis member.

2. The plural-unit cargo carrier of claim 1 and including motive means on said chassis member and connected to said fluid power supply conduit means to be operated thereby for actuating said pin means to lock the cargo-carrying bodies on said chassis member.

3. The plural-unit cargo carrier of claim 2 and including a control panel means positioned on the cargo-carrying bodies having valve means operatively connected to the power supply on the chassis member and including coupling means adapted to be connected to conduit means on the cargo-carrying bodies.

4. The plural-unit cargo carrier of claim 3 in which each of the cargo-carrying bodies have doors on at least one of the ends of the same and in which each door is surrounded by tubing forming an inflatable type seal controllably inflated through the control panel means from the fluid power supply and adapted to abut against a similar inflatable seal on an adjacent cargo-carrying body positioned on said chassis member to seal the door areas of said cargo-carrying bodies.

5. The plural-unit cargo carrier of claim 1 in which the flange member on each of the cargo-carrying bodies has a plurality of equally spaced apertures therein and the channel means on the chassis member has similarly spaced apertures therein, and a pin means associated with each of said apertures adapted to extend through said apertures in said flange member and said channel means to couple and lock each of the bodies on the chassis member.

6. The plural-unit cargo carrier of claim 5 in which the pin means associated with each of said apertures on the chassis member includes a spring-biased pin with all of said pins being coupled to a common shaft to cause simultaneous movement of said pins relative to said apertures, and including a single motive means connected between the chassis member and the common shaft to rotate the same and simultaneously move said pins in a direction opposite to the bias force for the same.

7. The plural-unit cargo carrier of claim 5 in which the fluid power supply conduit means on the chassis member includes a plurality of spaced coupled members along the extent of the same to which said control panel means may be selectively connected.

8. The plural-unit cargo carrier of claim 4 in which a control means in the control panel means of the cargo-carrying body is connected to the fluid power supply and the tubing to control the inflation of the tubing forming the seals around the doors of the cargo-carrying bodies.

References Cited

UNITED STATES PATENTS

| 2,223,275 | 11/1940 | Valenzuela. | |
|---|---|---|---|
| 3,002,760 | 10/1961 | Lee | 214—515 XR |
| 3,073,466 | 1/1963 | Greer et al. | 214—515 |
| 3,289,868 | 12/1966 | Miller et al. | 214—515 |

ALBERT J. MAKAY, Primary Examiner

U.S. Cl. X.R.

296—35